April 20, 1926. Re. 16,329

P. GANZHORN

GAME

Original Filed Jan. 19, 1925

Inventor
Philip Ganzhorn
by Frank J. Schraeder Jr.
Attorney.

Reissued Apr. 20, 1926. Re. 16,329

UNITED STATES PATENT OFFICE.

PHILIP GANZHORN, OF GLEN ELLYN, ILLINOIS.

GAME.

Original No. 1,555,363, dated September 29, 1925, Serial No. 3,361, filed January 19, 1925. Application for reissue filed February 10, 1926. Serial No. 87,445.

*To all whom it may concern:*

Be it known that I, PHILIP GANZHORN, a citizen of the United States, and resident of Glen Ellyn, in the county of Du Page, State of Illinois, have invented new and useful Improvements in Games, of which the following is a specification.

This invention relates to an amusement device in the nature of a game, the primary object thereof being to provide a device which will be entertaining and instructive. The invention comprises a board having indicated thereon a plurality of routes or highways, all of the routes being divided into a like number of parts, the sections having progressive indications thereon which are like on corresponding sections of the different routes or highways. As a part of the game, there is a device having indicia marks corresponding to the indicia on the highways and operable by a player so as to bring by chance an indicating mark into counting position.

Figure 1:
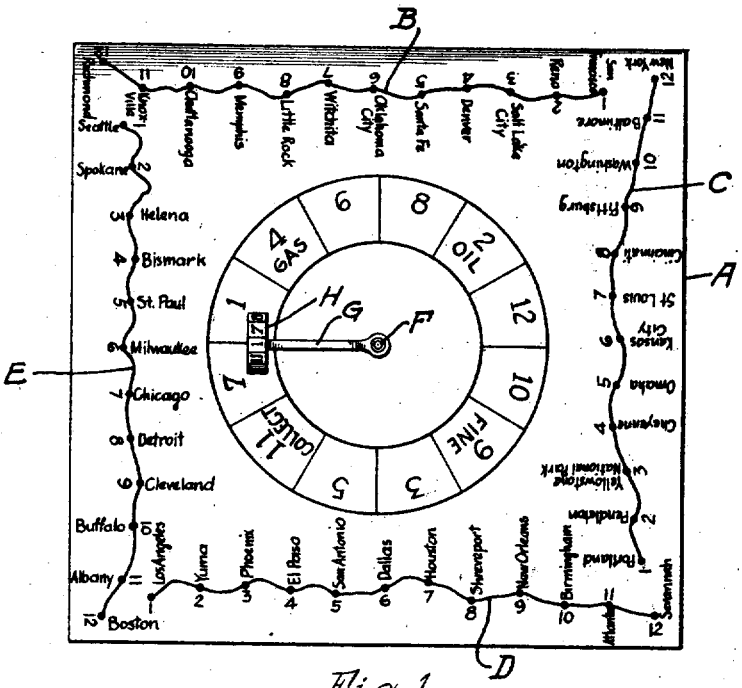
Figure 4:
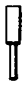
Figure 2:
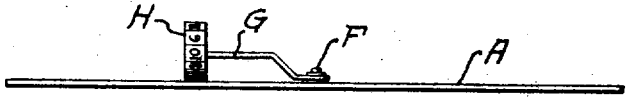
Figure 3:
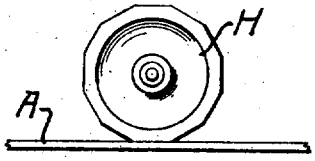

These objects together with other objects and corresponding accomplishments are obtained by means of the embodiment of my invention illustrated in the accompanying drawing, in which:

Figure 1 is a plan view of a board with an indicator thereon; Figure 2 is an elevation; Figure 3 is an end view on an enlarged scale of the indicator wheel; and Figure 4 is a side elevation of a position indicating peg.

Referring more particularly to the drawing, a board A is shown having at its edges four lines each line being in the nature of a map of a route or transcontinental automobile highway. These routes are indicated by B, C, D, and E. The routes are divided into an equal number of parts which may be conveniently done by means of holes in the board. These holes are marked with numerals in progression from one end to the other and also with names of cities. Thus, in the present instance one terminal of a highway is marked San Francisco, and the other terminal Richmond. There are twelve holes along the route, San Francisco being marked 1 and Richmond 12. Similarly there are twelve holes on each of the other routes. These holes are adapted to receive position indicating pegs for indicating the progress of a player. At the center of the board is a spindle F and mounted thereon so that it may freely revolve is an arm G. The arm G has journalled thereon a polygonal indicator wheel H. This wheel has faces corresponding in number to the number of holes in the route. Each face is marked with a number corresponding to a number on the route. These numbers are arranged in any order upon the faces. The indicator is so arranged that the arm G may be spun by a player and allowed to come to rest. One face will rest uppermost with a number displayed, which is the counting number. As certain of the numbers have a meaning other than that corresponding to the positions on the routes, they are so denoted in Fig. 1. In the present instance, there are four faces each having a penalty meaning. These faces are conveniently marked upon the board, as 4, 2, 9 and 11, Gas, Oil, Fine, and Collect, respectively. It is obvious that the particular relation of the numbers and the penalties may be changed.

The game may be played by two or more persons, the present board having four routes being limited to four players as a maximum. However, it is obvious that a greater number of routes may be indicated on a board to provide for a greater number of players. Two receptacles may be provided for tokens, each player being provided with an equal number of tokens at the commencement of the game. One of the receptacles is designated the Treasury and the other Revenue. Each player is also provided with a peg adapted to be inserted in the hole along the route. Selection of the first player to operate the indicator is made in any desired manner. The selected player then spins the indicator by giving the arm G a push. It is advisable to make it a rule of the game that the indicator must be turned by a player through at least one half of a revolution. The indicator comes to rest with a face and a number thereon being disposed upwardly, this being the counting number. Unless the number displayed uppermost on the first spin is 1, no move along the route can be made by the player. If the number is 1, the player places his peg in the hole numbered 1. The right to manipulation of the indicator passes around the board from one player to the next in progression. Thus, the manipulation may pass from one player to the next player on his right. The next player then spins the indicator and his progress along the route depends upon the indicator stopping with 1 in counting position. Each player has the right to a single spin. If the counting number on the first spin is not one, no progress is made along the route. After the player has placed his peg in hole 1, the next number to be shown for his progress along the route is 2 and so on. If at any time a player spins the indicator and it stops so as to display 4, it will be necessary for him to pay a selected number of tokens into the treasury for gas. Thus, the amount to be paid for gas may be determined as one token. Each time that a player spins the indicator so that 4 is in display position, he must pay the treasury for gas. If the number 2 appears, the player must pay into the treasury for oil. Oil may, for illustration, cost two tokens. There is also a number indicating a fine. This number in the present apparatus is 9. A fine may cost five tokens. The number 11 indicates "Collect". If a player spins the number 11, he will collect from the treasury all of the tokens except one. This token is then transferred to the revenue receptacle and remains there until the end of the game. The player who reaches the end of his route or highway first wins and collects as his reward all of the tokens in both the revenue and treasury receptacles. These may be less in number than the amount that he paid into the treasury for gas, oil, and fines. The game may be varied from that just described without departing from the spirit of the invention.

What I claim is:

1. A game comprising a playing board designed to represent a plurality of highways, said highways being divided into an equal number of sections, the sections on a highway being numbered consecutively corresponding sections on the highways being marked by like numbers, position indicating means adapted to be placed in the sections and moved at will, and a counting indicator arranged to denote numbers corresponding to the numbers on the highways and adapted to be manipulated by a player to display one of said numbers by chance, certain of the numbers on said counting indicator also denoting penalties.

2. A game comprising a playing board designed to represent a plurality of highways, said highways being divided into an equal number of sections, the sections on a highway being consecutively numbered and corresponding sections on the highways being marked by like numbers, position indicating means adapted to be placed in the sections and moved at will, and a spinning indicator mounted on said board and arranged to denote by chance numbers corresponding to the numbers on the highways, certain of the numbers also denoting penalties.

3. A game comprising a playing board designed to represent a plurality of highways, said highways being divided into an equal number of sections by means of holes in said board, corresponding sections on the highways being marked by like indicia, a peg for each player adapted to be placed in a hole, a spinning indicator comprising an arm pivotally secured to said board so that it may be revolved, a wheel having flat faces rotatably mounted on said arm so as to ride on said board, the faces bearing marks corresponding to the indicia on said highways, whereby the indicator may be manipulated by a player so as to display one of said marks uppermost by chance.

4. A game comprising a playing board designed to represent a plurality of highways, said highways being divided into an equal number of sections by means of holes in the board corresponding sections on the highways being marked by like indicia, pegs adapted to be placed in the holes, a spinning indicator comprising an arm revolubly mounted on said board, a wheel having flat faces rotatably mounted on said arm so as to ride on said board, faces on said wheel corresponding to the section on said highway and having indicia marks corresponding to the indicia on the highways, whereby said indicator may be manipulated by a player to display one of said marks uppermost by chance, certain of the indicia marks on said wheel indicating penalties.

5. A game comprising a playing board provided with a plurality of indications, an arm rotatably secured to said board, and a wheel journalled on said arm to ride on said board, said wheel having a plurality of indicia thereon corresponding to said board indications.

6. A game comprising a playing board provided with a plurality of indications, an arm rotatably secured to said board, and a wheel journalled on said arm to ride on said board, said wheel having a plurality of indicia marks on its rim corresponding to said board indications.

7. A game comprising a playing board provided with a plurality of indications of numerals in progression, an arm rotatably secured to said board, and a wheel journalled on said arm to ride on said board, said wheel having a plurality of indicia thereon corresponding to said board indications.

8. A game comprising a playing board provided with a plurality of indications, an arm rotatably mounted on said board, and a wheel having a polygonal rim, said wheel being journalled to said arm and adapted to ride on said rim, said rim having a plurality of indicia marks thereon corresponding to said board indications.

In witness whereof, I affix my signature.

PHILIP GANZHORN.